US009880402B2

(12) United States Patent
Aiiso et al.

(10) Patent No.: US 9,880,402 B2
(45) Date of Patent: Jan. 30, 2018

(54) METHOD FOR PRODUCING POLARIZING LENS WITH HIGH REFRACTIVE INDEX

(75) Inventors: Yoshimitu Aiiso, Sabae (JP); Toshie Torii, Sabae (JP)

(73) Assignee: Hopnic Laboratory Co., Ltd, Fukui (JP)

( * ) Notice: Subject to any disclaimer, the term of this patent is extended or adjusted under 35 U.S.C. 154(b) by 1219 days.

(21) Appl. No.: 10/554,343

(22) PCT Filed: May 12, 2004

(86) PCT No.: PCT/JP2004/006376
§ 371 (c)(1),
(2), (4) Date: Aug. 14, 2006

(87) PCT Pub. No.: WO2004/099859
PCT Pub. Date: Nov. 18, 2004

(65) Prior Publication Data
US 2007/0058253 A1    Mar. 15, 2007

(30) Foreign Application Priority Data
May 12, 2003    (JP) ................. 2003-132518

(51) Int. Cl.
*B29D 11/00* (2006.01)
*G02C 7/12* (2006.01)
*C08L 29/04* (2006.01)
*C08L 81/00* (2006.01)
*G02B 1/08* (2006.01)
*B29K 75/00* (2006.01)
*B29K 105/00* (2006.01)

(52) U.S. Cl.
CPC .......... *G02C 7/12* (2013.01); *B29D 11/00009* (2013.01); *B29D 11/0073* (2013.01); *B29D 11/00644* (2013.01); *C08L 29/04* (2013.01); *C08L 81/00* (2013.01); *G02B 1/08* (2013.01); *B29K 2075/00* (2013.01); *B29K 2105/0002* (2013.01); *B29K 2629/04* (2013.01)

(58) Field of Classification Search
CPC .......... B29D 11/0073; B29D 11/00644; G02B 27/28
USPC ...................................................... 264/1.34
See application file for complete search history.

(56) References Cited

U.S. PATENT DOCUMENTS

| 3,852,375 A * | 12/1974 | Biethan et al. ................ 524/539 |
| 4,564,545 A * | 1/1986 | Okumura et al. .............. 428/76 |
| 4,853,454 A * | 8/1989 | Merger et al. ................... 528/59 |
| 5,235,014 A * | 8/1993 | Chen et al. ..................... 526/301 |
| 5,496,641 A * | 3/1996 | Mase et al. ................. 428/423.1 |
| 5,926,310 A * | 7/1999 | Tamura et al. ................ 359/350 |
| 6,755,996 B1 * | 6/2004 | Greshes ......................... 264/2.4 |
| 6,814,902 B2 * | 11/2004 | Yamamoto et al. ........... 264/1.7 |
| 7,767,304 B2 * | 8/2010 | Berzon ............ B29D 11/00634 264/1.7 |
| 2001/0028435 A1 * | 10/2001 | Evans et al. ................... 351/163 |
| 2003/0006535 A1 * | 1/2003 | Hennessey et al. .......... 264/403 |
| 2004/0114240 A1 * | 6/2004 | Niki et al. ...................... 359/490 |
| 2009/0079934 A1 * | 3/2009 | Su ...................... B29D 11/0073 351/159.56 |
| 2009/0201584 A1 * | 8/2009 | Ryu .......................... G02B 1/08 359/485.01 |

FOREIGN PATENT DOCUMENTS

| JP | 59187819 A | * 10/1984 | ............... G02B 1/04 |
| JP | 61-235113 A | 10/1986 | |
| JP | 8-254614 | 10/1996 | |
| JP | 08254614 A | * 10/1996 | ............... G02B 5/30 |
| JP | 8254614 A | 10/1996 | |
| JP | 9-258009 | 10/1997 | |
| JP | 9258009 A | 10/1997 | |
| JP | 10039137 A | * 2/1998 | ............. B29K 29/00 |
| JP | 2000-108219 | 4/2000 | |
| JP | 2000108219 A | * 4/2000 | ............. B29D 11/00 |
| JP | 2001-249227 A | 9/2001 | |
| JP | 2001249227 A | * 9/2001 | ............... G02B 5/30 |

OTHER PUBLICATIONS

Numata, M. et al., The States of Water in Poly (vinyl Alcohol) Membranes, Journal of Human Environmental Engineering, 2001, vol. 3, No. 2, pp. 210-213 (and corresponding English translation pp. 1-4).
UL Prospector, "Thermopastic Polyurethane (TPU) Typical Properties Generic TPU-Polyether," pp. 1-4, available at https://plastics.ulprospector.com/generics/54/c/t/thermoplastic-polyurethane-tpu-properties-processing/sp/11 (downloaded Aug. 4, 2017).

* cited by examiner

Primary Examiner — Alison L Hindenlang
(74) Attorney, Agent, or Firm — Pearne & Gordon LLP

(57) ABSTRACT

A manufacturing method for a polyurethane based high refractive index polarizing lens comprising polyisocyanate and polythiol, that has no problems such as the generation of bubbles, and has excellent adhesiveness. A manufacturing method for high refractive index polarizing lenses including a process for forming lens layers comprising a polyurethane based polymer formed from polyisocyanate and polythiol on both surfaces of a polarizing film, characterized by using a polarizing film whereof the water content is 4.5 wt % or less as the aforementioned polarizing film.

2 Claims, No Drawings

METHOD FOR PRODUCING POLARIZING LENS WITH HIGH REFRACTIVE INDEX

TECHNICAL FIELD

The present invention concerns manufacturing method for a high refractive index polarizing lens using a polyurethane based polymer formed from polyisocyanate and polythiol.

BACKGROUND ART

Generally, polarizing lenses block polarized light generated when natural light is reflected, and are therefore used for their anti-glare effects or light reducing effects. In recent years, taking advantage of such effects of polarizing lenses, they have been used particularly for protection from polarized light outdoors, for example for protection against polarized light reflected from snow surfaces at a ski resort, or protection from diffuse reflection from water surfaces during fishing, or for protection against reflected light from oncoming cars when driving a car. Additionally, in other fields, polarizing lenses are used for many things, including sunglasses and fashion glasses with the objective of reducing light.

As a transparent resin constituting these polarizing lenses, diethylene glycol bis(allyl carbonate) resin, being a resin with a lower specific gravity than glass at 1.32, having excellent heat resistance, water resistance, solvent resistance, and workability, and further having vision correction effects, and still further optimal for productivity of small quantities of diverse products, is primarily used. Diethylene glycol bis(allyl carbonate) resin polarizing lenses are generally manufactured by the method (cast polymerization) described in Patent Publication 1, wherein, after fitting molds into both sides of a gasket, and placing a polarizing film between the two molds, the space is filled with diethylene glycol bis(allyl carbonate) monomer wherein a polymerization initiator has been mixed and dissolved, and the monomer is cured by polymerization. Alternatively, there are cases where polarizing lenses are manufactured by adhesively joining together two lenses with a polarizing film sandwiched in between, as described in Patent Publication 2.

[Patent Publication 1] Japanese Unexamined Patent Publication No. S61-235113
[Patent Publication 2] Japanese Unexamined Patent Publication No. 2001-249227

DISCLOSURE OF THE INVENTION

Problems to be Solved by the Invention

However, diethylene glycol bis(allyl carbonate) resin had the drawback of having a low refractive index of 1.50, and when this was made into a minus lens with a high diopter, the rim of the lens became thick, making it heavy and look unattractive. In recent years, as a resin for ameliorating this drawback, a high refractive index lens (refractive index 1.60-1.70) made from polyurethane based resin, formed from polyisocyanate and polythiol, was developed, and demand for this resin is still increasing at present. However, when this polyurethane based monomer formed from polyisocyanate and polythiol was used, if casting was done according to the method described in the aforementioned Patent Publication 1, there were cases where problems occurred wherein small bubbles formed in the vicinity of the boundary between the polarizing film and the resin layer, and the polarizing film and the resin layer became detached easily.

Additionally, when two polyurethane based resin high refractive index lenses having joining surfaces with mutually complementary shapes were manufactured from polyisocyanate and polythiol, the joining surfaces of each of the lenses were coated with a monomer mixture containing polyisocyanate and polythiol, and they were fixed with a polarizing film sandwiched between the two joining surfaces through a monomer mixture (adhesive agent), and subsequently heated in order to conduct polymerization curing (a method similar to that in the aforementioned Patent Publication 2), a phenomenon was observed wherein small bubbles were generated between the polarizing film and the lens, similarly to the aforementioned lens.

The present invention has the objective of providing a manufacturing method for polyurethane based high refractive index polarizing lenses formed from polyisocyanate and polythiol that overcomes said problems, and has excellent adhesiveness between the polarizing film and the lens layer.

Means for Solving the Problems

The present inventors conducted keen investigation into the relationship between moisture within a polarizing film and the generation of bubbles, from the standpoint that one of the causes of the aforementioned small bubbles is moisture within the polarizing film. As a result it was found that the generation of bubbles could be suppressed by making the water content within the polarizing film approximately 4.5 wt % or less, whereupon the present invention was created.

Accordingly, the present invention provides a manufacturing method for high refractive index polarizing lenses including a process for forming lens layers comprising a polyurethane based polymer formed from polyisocyanate and polythiol on both surfaces of a polarizing film, characterized by using a polarizing film whereof the water content is 4.5 wt % or less as the aforementioned polarizing film.

Additionally, when diethylene glycol bis(allyl carbonate) and a polarizing film are adhesively joined by polymerization, conventionally, in order to increase the adhesive strength, a coating treatment is generally performed on the polarizing film with silane coupling agent or the like that would form a medium, but it was found that for a polyurethane based resin formed from polyisocyanate and polythiol, a sufficient adhesive strength was obtainable even without coating the polarizing film. Therefore, in the present invention, a polarizing film that has a water content of 4.5 wt % or less, and whereof the surface is untreated, is preferably used.

Effects of the Invention

According to the manufacturing method of the present invention, a polyurethane-based high refractive index polarizing lens formed from polyisocyanate and polythiol, having excellent adhesiveness between the polarizing film and the lens layer, and whereof the generation of bubbles in the vicinity of the boundary between the polarizing film and the lens layer can be dramatically suppressed, is obtainable.

BEST MODE FOR EMBODYING THE INVENTION

Herebelow, a preferable embodiment of the manufacturing method of the high refractive index polarizing lens according to the present invention shall be explained.

In the manufacturing method according to claim 2 (herebelow called "first embodiment"), a high refractive index lens is manufactured through a process for forming lens layers on both surfaces of a polarizing film using the method of cast polymerization (lens layer forming process).

In more detail, first, molds are fitted into both sides of a gasket, and in the empty space defied by the gasket inner surface and both molds, a polarizing film is placed whereof the water content is 4.5 wt % or less, and whereof the surface is untreated.

Next, the gap between each of the molds and the polarizing film within the aforementioned empty space is filled with a monomer mixture containing polyisocyanate and polythiol.

The monomer mixture used here contains polyisocyanate and polythiol.

"Polyisocyanate" in the present invention refers to an organic compound having two or more isocyanate groups within one molecule, and concrete examples are hexamethylene diisocyanate, 4,4'-dicyclohexylmethane diisocyanate, isophorone diisocyanate, methylcyclohexane diisocyanate, 2,2,4-trimethylcyclohexane diisocyanate, isopropylidene bis (4-cyclohexylisocyanate), 1,3-bis(isocyanatomethyl) cyclohexane, norbornene diisocyanate, aliphatic or alicyclic polyisocyanates such as biuret reaction products of hexamethylene diisocyanate, adduct reaction products between hexamethylene diisocyanate and trimethylol propane, and further, aromatic polyisocyanates such as p-phenylene diisocyanate, trylene diisocyanate, xylylene diisocyanate, and diphenylethane diisocyanate.

On the other hand, "polythiol" refers to organic compounds having two or more thiol groups on one molecule, and concrete examples are ethane dithiol, hexane dithiol, bis(2-mercaptoethyl) ether, bis(2-mercaptoethyl) thioether, trimethylol propane tris thioglycolate, trimethylol propane tris(3-mercaptopropionate), pentaerythritol tetrakis thioflycolate, pentaerythritol tetrakis(3-mercaptopropionate), 4-mercaptomethyl-3,6-dithia-1,8-octane dithiol, 2,5-bis (mercaptomethyl)-1,4-dithiane, 1,2-bis (mercaptomethyl) benzene, 1,3-bis(mercapotomethyl) benzene, 1,4-bis (mercaptomethyl) benzene, tris(3-mercaptopropyl) triisocyanate, and the like.

One or more types of each of these polyisocyanates and polythiols may be mixed and used. However, it is desirable for the blending ratio of polyisocyanate and polythiol to be such that the number of isocyanate groups and thiol groups are equivalent. For example, when mixing xylylene diisocyanate and pentaerythritol tetrakis(3-mercaptopropionate), it is appropriate to make their respective contents 43 wt % and 57 wt %, in order to make their respective ratios equivalent.

It is preferable for the monomer mixture used in this embodiment to have a composition such that it becomes transparent and forms a lens with a refractive index of 1.59 or greater when cured by polymerization. Such a composition can easily be determined by those skilled in the art.

According to need, reaction accelerators such as dibutyltin dilaurate, ultraviolet absorbers, mold release agent, dyestuff, and the like may be added to this monomer mixture.

Next, by polymerization curing of the filled monomer mixture, lens layers comprising a polyurethane-based polymer formed from polyisocyanate and polythiol is formed on both surfaces of the polarizing film.

Normally, polymerization curing is conducted by starting at a temperature between 5° C. to 40° C., and subsequently, gradually raising the temperature over a period of time to an upper limit of 110° C. to 120° C., and then heating for 2 to 4 hours at that temperature. However, if a membrane that has been iodine stained is used as a polarizing film, heating to above 110° C. will make the polarizing film become discolored, and variations and unevenness in the coloring may be created, so it is preferable for polymerization to be done by raising the temperature to an upper limit of 90° C. to 105° C. degrees C., and subsequently maintaining that temperature for 4 to 10 hours, depending upon the demolding property.

After polymerization curing, the integral molded product (polarizing lens) is demolded, and it is preferable to perform annealing treatment by heating the demolded lens, with the objective of alleviating the strain due to polymerization. The annealing treatment temperature should normally be done at 110° C. to 125° C., from approximately 1 to 3 hours. However, if a polarizing film that has been iodine stained is used, this treatment should be done at 90° C. to 105° C., for approximately 1 to 3 hours.

As the material of the gasket to be used in this first embodiment, polyvinyl chloride, ethylene vinyl acetate copolymer, ethylene ethyl acrylate copolymer, ethylene propylene copolymer, ethylene propylene dien copolymer, polyurethane elastomer, fluorocarbon rubber, or soft elastic resins made by blending polypropylene with these may be used, but a material should be selected that does not swell or dissolve out when used with a monomer mixture containing polyisocyanate and polythiol.

In the manufacturing method according to claim 3 (herebelow referred to as "second embodiment"), a high refractive index polarizing lens is manufactured through a process wherein two high refractive index lenses manufactured separately are adhesively joined together with a polarizing film sandwiched therebetween, using a monomer mixture containing polyisocyanate and polythiol as an adhesive agent.

In more detail, first, two high refractive index lenses comprising a polyurethane based polymer formed from polyisocyanate and polythiol are prepared. It is necessary for these two lenses to be such that the curvatures of the joining surfaces that are adhesively joined together are identical, that is, the shapes of the joining surfaces of the two lenses should be complementary to each other.

These lenses are moldable by using the monomer mixture containing polyisocyanate and polythiol described in the abovementioned first embodiment by, for example, the abovementioned method called cast polymerization. Commercially available polyurethane based high refractive index lenses formed from polyisocyanate and polythiol may also be used by polishing the joining surfaces thereof so that the curvatures of the mutually joining surfaces fit together.

Next, a monomer mixture (adhesive agent) containing polyisocyanate and polythiol is coated onto one surface (joining surface) of each of the lenses.

Here, the monomer mixture containing polyisocyanate and polythiol used as an adhesive agent may be the same as that used in the abovementioned first embodiment. Preferably, the monomer mixture used here should have an identical composition to the monomer composition comprising the two polyurethane based high refractive index lenses that are adhesively joined together. If the monomer composition differs, the refractive index will also be different, and as a result, there are cases where reflection may occur between a lens and an adhesive surface. Additionally, it is preferable for no mold releasing agent to be added to the monomer mixture used as the adhesive agent, or if necessary, a tiny amount of mold releasing agent should be added to a degree that does not affect adhesiveness.

Next, the objective high refractive index polarizing lens is obtained by sandwiching a polarizing film with a water content of 4.5 wt % or less between joining surfaces whereon the aforementioned adhesive agent (monomer mixture) is coated, and fixing this, and causing polymerization curing of the aforementioned monomer mixture by heating.

Polymerization curing is done under similar conditions to the first embodiment. That is, normally, curing is done by heating gradually from room temperature to 120° C. over a period of over 30 minutes, but it is preferable when using a polarizing film that has been iodine stained to make 105° C. the upper limit.

In both the abovementioned first embodiment and the second embodiment, the polarizing film used should be a membrane with a water content of 4.5 wt % or less, preferably 4.3 wt % or less, and even more preferably 4.0 wt % or less. If a polarizing film with a water content higher than approximately 4.5 wt % was used, after the monomer mixture was polymerization cured, the generation of small bubbles could be seen between the polarizing film and the lens.

As the polarizing film to be used, it is preferable to use a polyvinyl alcohol membrane, the most widely used type in polarizing lenses. This polarizing film can be obtained by stretching and orienting a thin polyvinyl alcohol film, and staining with iodine or a dichroic dye. In addition, polarizing films manufactured from polymer films such as polyvinyl chloride or polyethylene terephthalate or the like may be used.

In cases where the water content of the polarizing film exceeds 4.5 wt %, the manufacturing method of the present invention further includes a drying process wherein the water content of the polarizing film is decreased to 4.5 wt % or less prior to performing the aforementioned lens layer forming process.

The drying process in the present invention includes the drying of a polarizing film using such means as heating, air drying, vacuum drying, and the like. However, when heating, it is preferable for heating to be done to a temperature less than the glass transition point of the material (polymer) constituting the polarizing film, and in the case of iodine stained polarizing films, it is preferable for heating to be done with an upper limit of approximately 105° C.

The polyvinyl alcohol constituting the polarizing film is a polymer with an inherently high moisture absorbing property. Accordingly, in cases where the water content thereof exceeds 4.5%, it is preferable for heating and drying to be done to a temperature lower than the glass transition point (approximately 70° C.) of the polyvinyl alcohol, to make the water content 4.5% or less.

The present inventors believe that water within the polarizing film, and polyisocyanate contained in the monomer mixture used for casting or adhesion react, and the carbon dioxide gas generated at that time forms bubbles. Therefore, by lowering the water content of the polarizing film to approximately 4.5 wt % or lower, the aforementioned reaction was suppressed, and as a result, there were no bubbles, and a laminated body with excellent adhesiveness was obtained.

"Water content (wt %)" in the present invention is the proportion (%) by which the weight of the membrane in a perfectly dry state increases due to having absorbed water. Additionally, the "perfectly dry state" of the present invention is defined as the state after the membrane has been vacuum dried for 4 hours or longer at 90° C.

Example 1

Herebelow, the present invention shall be explained more concretely based upon Examples.

Using a commercially available polyvinyl alcohol dichroic dye based polarizing film with a thickness of 40 μm, a polarizing lens was manufactured according to the method of the first embodiment of the present invention, and additionally, the relationship between the water content of the polarizing film and the presence or absence of bubbles was investigated.

Concretely, the following method was used.

(1) A polarizing film was humidity-regulated by letting stand for 24 hours in a constant temperature constant humidity oven set at a temperature of 20° C. and a relative humidity of 65%.

(2) A humidity-regulated polarizing film was placed inside a hot air circulating type oven set at a temperature of 60° C., removed 30 minutes later, immediately placed inside a glass mold set for lens casting, and a monomer mixture of polyisocyanate and polythiol that was blended in advance was injected into both sides thereof.

(3) After injection, this mold set was placed inside a hot air circulation style oven, and after having been maintained for 10 hours at 30° C., the temperature was raised gradually to 110° C. over 8 hours, and further kept for 3 hours at 110° C. to cure it by polymerization.

(4) Next, after having cooled to 60° C., the mold set was removed from the oven and demolded, and the presence or absence of bubbles in the lens was investigated. The results are shown in Table 1 shown below.

TABLE 1

|  | Heating Time | | | | | |
| --- | --- | --- | --- | --- | --- | --- |
|  | 0 Hrs | 0.5 Hrs | 1.0 Hrs | 1.5 Hrs | 2.0 Hrs | 2.5 Hrs |
| Polarizing Membrane Water Content (wt %) | 8.67 | 5.60 | 4.72 | 4.30 | 3.85 | 3.52 |
| Presence or Absence of Bubbles | Present | Present | Present | Absent | Absent | Absent |

As is evident from Table 1, when the water content of the polarizing film is 4.30% or less (heating time 1.5 hours or longer), an excellent polarizing lens with no bubbles was obtained, but at 4.72% or greater (heating time 1.0 hours or less), tiny bubbles were generated. Additionally, as the water content increased, the number of bubbles also increased, and a tendency for their size to increase was also seen.

In the above, the water content of the polarizing film was found by immediately measuring the weight (W1) of another polarizing film taken out of the oven at the same time, then quickly putting this into a vacuum dryer already maintained at 90° C., and drying for 5 hours in a vacuum, then measuring the weight (W0) thereof in such a manner that no moisture is absorbed, and calculating based upon the change in weight before and after drying using the following equation.

$$\text{Water Content(wt \%)} = [(W1 - W0)/W0] \times 100$$

When the weight change of the polarizing film during vacuum drying at 90° C. was measured, a constant weight was reached in 4 hours.

Additionally, the monomer mixture used for casting was prepared by blending 51 parts by weight norbornane diisocyanate, 23 parts by weight pentaerythritol tetrakis(3-mercaptopropionate), and 26 parts by weight 4-mercaptomethyl-3,6-dithia-1,8-octane dithiol, further adding 0.06 parts by weight dibutyltin dilaurate as a curing accelerator and 0.1 parts by weight Zelec UN (product name) as a demolding agent and dissolving them, and performing defoaming treatment under reduced pressure.

Example 2

Using a commercially available polyvinyl alcohol iodine based polarizing film with a thickness of 50 μm, a polarizing lens was manufactured according to the method of the second embodiment of the present invention, and additionally, the relationship between the water content of the polarizing film and the presence or absence of bubbles was investigated.

Concretely, the following method was used.

(1) Humidity-regulation and drying of the polarizing film was done in a similar manner to the aforementioned Example 1.

(2) A polarizing film taken out of a hot air circulating type oven was immediately inserted into the joining surfaces of two polyurethane based high refractive index lenses whereon a monomer mixture of polyisocyanate and polythiol was coated, adhesively joined together, and fixed.

(3) The adhesively joined lenses were placed inside a hot air circulating type oven, and polymerization curing was done by raising the temperature from 30° C. to 90° C. over 30 minutes, and maintaining for 10 hours at 90° C.

(4) Next, after cooling to 60° C., the adhesively joined lens laminated body was removed from the oven and the absence or presence of bubbles was investigated.

The water content of the polarizing film was calculated using a similar method to that used for Example 1. The results are shown below in Table 2.

TABLE 2

| | Heating Time | | | | | |
|---|---|---|---|---|---|---|
| | 0 Hrs | 0.5 Hrs | 1.0 Hrs | 1.5 Hrs | 2.0 Hrs | 2.5 Hrs |
| Polarizing Membrane Water Content (wt %) | 8.23 | 5.47 | 4.69 | 4.35 | 3.91 | 3.64 |
| Presence or Absence of Bubbles | Present | Present | Present | Absent | Absent | Absent |

As is evident from Table 2, when the water content of the polarizing film was 4.35% or less (heating time 1.5 hours or longer), an excellent polarizing lens with no bubbles was obtained, but with a water content of 4.69% or greater (heating time 1.0 hours or less), tiny bubbles were generated. In this case as well, as the water content increased, the number of bubbles also increased, and their size also increased.

The monomer mixture used for adhesive joining was prepared by blending 51 parts by weight norbornane diisocyanate, 23 parts by weight pentaerythritol tetrakis(3-mercaptopropionate), and 26 parts by weight 4-mercaptomethyl-3,6-dithia-1,8-octane dithiol, further adding 0.06 parts by weight dibutyltin dilaurate as a curing accelerator and dissolving them, and performing defoaming treatment under reduced pressure.

The two lenses used for adhesive joining were made in the following manner.

(1) A monomer mixture was prepared by blending 51 parts by weight norbornane diisocyanate, 23 parts by weight pentaerythritol tetrakis(3-mercaptopropionate), and 26 parts by weight 4-mercaptomethyl-3,6-dithia-1,8-octane dithiol, further adding 0.06 parts by weight dibutyltin dilaurate as a curing accelerator and 0.1 parts by weight Zelec UN (product name) as a demolding agent and dissolving them, and performing defoaming treatment under reduced pressure.

(2) The aforementioned monomer mixture was injected into a glass mold, this mold set was put inside a hot air circulating type oven, and after having been maintained for 10 hours at 30° C., the temperature was raised gradually to 110° C. over 8 hours, and polymerization curing was further done by maintaining for three hours at 110° C.

(3) Next, after cooling to 60° C., the mold set was removed from the oven and demolded.

(4) After demolding, annealing treatment was further done for 2 hours at 115° C. The refractive index of said lens was 1.593.

INDUSTRIAL APPLICABILITY

The present invention can be used for the manufacture of a high refractive index polarizing lens, particularly for a polyurethane based lens comprising polyisocyanate and polythiol. The process of adjusting the water content of the polarizing film in the manufacturing method of the present invention is also appropriate for the industrial production of lenses because, for example, it can be carried out using means such as heating, air drying, and vacuum drying.

The invention claimed is:

1. A manufacturing method for a polarizing lens having no bubbles, wherein a polarizing film is laminated with excellent adhesiveness to a cured monomer mixture containing polyisocyanate and polythiol, comprising the steps of:
    heating and drying a polarizing film, which is constituted by polyvinyl alcohol and has untreated surface, at a temperature lower than a glass transition point of the polyvinyl alcohol such that a water content of said polarizing film is 4.5 wt % or less to prevent generation of $CO_2$ bubbles due to a reaction of the water within said polarizing film with a polyisocyanate contained in the monomer mixture containing polyisocyanate and polythiol;
    placing the polarizing film inside a mold set for lens casting;
    filling a gap between each of the molds and said polarizing film with said monomer mixture; and
    curing said monomer mixture by polymerization.

2. The manufacturing method recited in claim 1, further including fitting molds on both sides of a gasket.

* * * * *